United States Patent Office 3,366,611
Patented Jan. 30, 1968

3,366,611
PREPARATION OF RANDOM COPOLYMERS
Clinton F. Wofford, Bartlesville, Okla., assignor to Phillips Petroleum Company, a corporation of Delaware
No Drawing. Filed Jan. 6, 1965, Ser. No. 423,834
4 Claims. (Cl. 260—84.7)

ABSTRACT OF THE DISCLOSURE

Addition of hexaalkyl phosphoramides as randomizing agents in a copolymerization process utilizing an organolithium catalyst system permits the formation of random copolymers while avoiding the necessity of recovering the randomizing agents from volatilized solvent and unreacted monomer during polymer recovery operations.

---

This invention relates to a method of preparing random polymers. In another aspect, this invention relates to a polymerization system wherein phosphoramides are employed to produce random polymers.

A process for preparing copolymers of conjugated dienes and vinyl-substituted aromatic compounds is described in U.S. Patent 2,975,160 issued March 14, 1961, to R. P. Zelinski. As disclosed in this patent, when a mixture of monomers is copolymerized using an organolithium initiator, a polar compound used in admixture with a hydrocarbon diluent promotes the random linkage of monomer units. In other words, the polar compound minimizes the formation of a block copolymer structure. Using such a process, a wide variety of useful rubbery copolymers can be made.

By omitting the polar compound from the polymerization mixture, an entirely different type of polymer is obtained, this being a copolymer in which the monomer units have polymerized sequentially to produce different types of blocks, or segments. The properties of such a product are quite different from those of the random copolymer, and it is commercially advantageous to be able to produce both types of polymers in the same facility. With this in view, polymerization methods and apparatus have been developed which permit the recovery of solvent and unreacted monomer in a manner which avoids contaminating the block copolymerization process with the polar organic compound used in the random copolymerization process. One approach to this problem has been to provide separate storage facilities for the recovered monomer and solvent and, further, to provide means of washing polar compound from recovered solvent so that the purified solvent could be used in either type of copolymerization. An improvement over this procedure involves the use of a polyether or a poly-tert-amine of sufficiently high boiling point that it tends to remain with the polymer rather than being carried over with the volatilized solvent and/or unreacted monomer. While this method has been very satisfactory, the products frequently have a higher vinyl content than desired.

In accordance with this invention I have discovered that hexaalkyl phosphoramides are effective randomizing agents for the copolymerization of at least two of the members selected from the group consisting of conjugated dienes and vinyl-substituted aromatic compounds in the presence of an organolithium initiator. The randomizing agents are effective when used in very small quantities, and they have such high boiling points that they tend to remain with the polymer rather than being carried over with the volatilized solvent and unreacted monomer during polymer recovery operations. This invention is applicable to any part of such monomers which polymerize at different rates and thus form block copolymers in the absence of randomizing agents.

Accordingly, it is an object of my invention to provide a method of forming a random copolymer. Another object is to provide a process for forming random copolymers which uses phosphoramides as the randomizing agents.

Other objects, aspects and the several advantages of the invention will be readily apparent to those skilled in the art from the detailed description and the appended claims.

The present invention represents a method for the production of random copolymers in the presence of organolithium initiators, or catalysts. The term "random copolymers" as applied to copolymers of conjugated dienes and vinyl-substituted aromatic compounds is intended to include products ranging from those in which there is no detectable polyvinyl aromatic block to copolymers containing up to about two percent polyvinyl aromatic components. In general, the monomers, catalyst and hydrocarbon diluents as well as the process conditions are the same as disclosed in the Zelinski patent. The monomers used in the process are at least two of the members selected from the group consisting of 1,3-butadiene, isoprene, piperylene and vinyl-substituted aromatic compounds. Mixtures of conjugated dienes can be used as can mixtures of vinyl-substituted aromatic compounds. Examples of the vinyl-substituted aromatic compounds include styrene, divinylbenzene, vinylnaphthalenes such as 1-vinylnaphthalene, and alkyl-substituted vinyl-aromatics in which the alkyl group is attached to the ring, such as 3-methylstyrene, and the like.

Any member of the known class of organolithium polymerization initiators can be used. These initiators are organic compounds which have at least one carbon-lithium bond and generally are otherwise hydrocarbon but can contain functional groups which are inert to the polymerization reaction. The lithium compound most commonly used is that having the formula $RLi_x$, where R is an aliphatic, cycloaliphatic or aromatic hydrocarbon radical having about 1 to 20 carbon atoms and $x$ is an integer of 1 to 4. Examples of such compounds include methyllithium, n-butyllithium, phenyllithium, cyclohexyllithium, 1,5-dilithionaphthalene, and the like. The amount of initiator used is generally in the range of about 0.05 to 150 millimoles, preferably 0.5 to 20 millimoles per 100 parts by weight of monomer.

The polymerization solvent which is used is a hydrocarbon which can be aromatic, paraffinic or cycloparaffinic. The solvent is a liquid under the conditions of the process, suitable examples being n-pentane, isooctane, cyclohexane, benzene, toluene, xylene, ethylbenzene, hexane, and the like. Mixtures of these solvents can be used.

The method of this invention is of greatest advantage in polymerizing a mixture of a conjugated diene and a vinyl-substituted aromatic compound to produce a rubbery copolymer.

The randomizing agents employed in this process are hexaalkyl phosphoramides. They can be represented by the formula

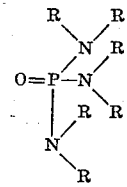

where each R is the same or a different alkyl radical containing from 1 to 8 carbon atoms. The compounds have high boiling points and are soluble in the hydrocarbon diluent used for the polymerization. For example, hexamethylphosphoramide has a boiling point of 76° C. at a pressure of 1 mm. Hg. Other compounds of this type include hexaethylphosphoramide, hexa - n - propylphosphoramide, and hexaoctylphosphoramide, hexaisopropylphosphoramide, trimethyltrihexylphosphoramide, dipropyltetraocyltphosphoramide and the like.

The randomizing agents are effective in very small amounts and are most frequently employed in the range of about 0.02 to 0.5 part by weight per 100 parts of monomer although higher amounts can be used, for example up to 10 parts by weight or more if desired. The advantage of the present invention can be realized more effectively, however, if the amount of randomizing agent used is small, and I prefer to use about 0.02 to 0.2 part by weight per 100 parts by weight of monomers when preparing rubbery products. By using a very small amount of this agent, the effect which it has on the polymer is negligible when it remains in the polymer rather than being carried over with the vaporized solvent during recovery steps. The amount of randomizing agent used in this manner is substantially independent of the amount of diluent employed. For most purposes, especially when preparing rubbery polymers, the mole ratio of phosphoramide to lithium equivalents in the initiator is in the range of 0.3:1 to 1.5:1, preferably in the range of 0.3:1 to 1:1. It will vary to some extent with the catalyst level and type of diluent.

The polymerization temperature can vary over a broad range, for example from —20 to 150° C., although a temperature less than 20° C. is seldom employed and a preferred temperature range is about 30° to 125° C. The pressure used is sufficient to maintain a liquid phase in the reaction zone.

In addition to being effective in very small amounts in directing random copolymerization, use of the randomizing agents named above greatly simplifies recovery of the hydrocarbon diluent. Upon completion of the polymerization in a batch reaction, the mixture is passed into a zone where a shortstop such as rosin acid, stearic acid, or other catalyst-inactivating agent is added. This mixture is then passed to a zone of lower pressure (flash separator) where the heat causes a portion of the diluent to flash overhead. The conditions in the flash separator can readily be controlled to vaporize and remove up to about 50 percent of the hydrocarbon diluent.

Although the conversion in such a polymerization is frequently quantitative, if unreacted monomer remains, most of this material is flashed overhead with the vaporized diluent. This vapor or vapor mixture is condensed and stored until needed for another polymerization reaction.

An antioxidant is added to the polymer solution containing the randomizing agent after which this mixture is passed into a steam stripper. The solvent is removed in this step leaving an aqueous slurry of the polymer crumb. The overhead solvent vapor is dried to permit its reuse in polymerization reactions and the polymer slurry is passed to conventionally recovery steps.

EXAMPLE

Runs were made for the random copolymerization of butadiene with styrene in the presence of n - butyllithium as the catalyst and hexamethylphosphoramide as the randomizing agent. The catalyst level, amount of randomizing agent, type of diluent, and polymerization temperature were varied. The following recipes were used:

|  | A | B | C |
|---|---|---|---|
| 1,3-butadiene, parts by weight | 75 | 75 | 75 |
| Styrene, parts by weight | 25 | 25 | 25 |
| n-Hexane, parts by weight | 570 | 570 | |
| Cyclohexane, parts by weight | | | 780 |
| n-Butyllithium, mhm | Variable | Variable | Variable |
| Hexamethylphosphoramide, mhm | Variable | Variable | Variable |
| Temperature, ° F | 158 | 122 | 122 |
| Time, hours | 4.5 | 20 | 3-16 | mhm.—Millimoles per 100 grams monomers.

In all runs the diluent was charged first after which the reactor was purged with nitrogen. Butadiene was added followed by the styrene, butyllithium, and hexamethylphosphoramide. Conversion was quantitative in all runs. At the conclusion of each polymerization, the reaction was terminated with a solution of 2,2' - methylene - bis (4 - methyl - 6 - tert - butylphenol) in a mixture of equal parts by volume of toluene and isopropyl alcohol, the amount used being sufficient to provide one part by weight of the antioxidant per 100 parts by weight of polymer. The product was coagulated in isopropyl alcohol, separated and dried. Results are presented in Table I.

TABLE I

| Run No. | Recipe | Butyllithium, mhm | | HMPA [2] | | Effective HMPA/BuLi Mole Ratio | Inherent Viscosity | Polystyrene,[3] percent |
|---|---|---|---|---|---|---|---|---|
| | | Charged | Effective [1] | Phm. | Mhm. | | | |
| 1 | A | 0.8 | 0.3 | 0.02 | 0.11 | 0.4/1 | 2.61 | 0.2 |
| 2 | A | 0.8 | 0.3 | 0.03 | 0.17 | 0.6/1 | 2.28 | 0 |
| 3 | A | 0.8 | 0.3 | 0.04 | 0.22 | 0.7/1 | 2.01 | 0 |
| 4 | A | 0.9 | 0.4 | 0.04 | 0.22 | 0.6/1 | 1.91 | 0 |
| 5 | A | 0.9 | 0.4 | 0.05 | 0.28 | 0.7/1 | 1.74 | 0 |
| 6 | A | 1.1 | 0.6 | 0.04 | 0.22 | 0.4/1 | 1.46 | 0 |
| 7 | A | 1.1 | 0.6 | 0.05 | 0.28 | 0.5/1 | 1.48 | 0 |
| 8 | B | 0.9 | 0.4 | 0.04 | 0.22 | 0.6/1 | 1.69 | 0 |
| 9 | B | 0.9 | 0.4 | 0.05 | 0.28 | 0.7/1 | 1.61 | 0 |
| 10 | B | 1.0 | 0.5 | 0.03 | 0.17 | 0.3/1 | 1.74 | 0.7 |
| 11 | B | 1.0 | 0.5 | 0.04 | 0.22 | 0.4/1 | 1.74 | 0 |
| 12 | B | 1.0 | 0.5 | 0.05 | 0.28 | 0.6/1 | 1.56 | 0 |
| 13 | B | 1.1 | 0.6 | 0.04 | 0.22 | 0.4/1 | 1.49 | 0 |
| 14 | B | 1.1 | 0.6 | 0.05 | 0.28 | 0.5/1 | 1.43 | 0 |
| 15 | C | 0.8 | 0.3 | 0.02 | 0.11 | 0.4/1 | 2.78 | 0 |
| 16 | C | 0.9 | 0.4 | 0.02 | 0.11 | 0.3/1 | 2.62 | 0 |
| 17 | C | 0.9 | 0.4 | 0.03 | 0.14 | 0.4/1 | 2.11 | 0 |
| 18 | C | 1.2 | 0.7 | 0.05 | 0.28 | 0.4/1 | 1.17 | 0 |
| 19 | C | 1.4 | 0.9 | 0.05 | 0.28 | 0.3/3 | 1.15 | 0 |
| 40 | C | 2.0 | 1.5 | 0.10 | 0.56 | 0.4/1 | 0.83 | 0 |

[1] Scavenger level determined as 0.5 mhm. butyllithium; effective butyllithium level was determined by subtracting the amount of scavenger required from the butyllithium charged.
[2] Hexamethylphosphoramide.
[3] Determined by oxidative degradation.

The data show that very small amounts of hexamethylphosphoramide are required to produce random copolymers. Products varying from low to high Mooney rubbers were obtained.

Reasonable variations and modifications of this invention can be made, or followed, in view of the foregoing, without departing from the spirit or scope thereof.

I claim:

1. A process for preparing random copolymers of conjugated dienes and vinyl-substituted aromatic hydrocarbons which comprises polymerizing a conjugated diene selected from the group consisting of 1,3 - butadiene, isoprene, and piperylene with a vinyl-substituted aromatic hydrocarbon with an organolithium polymerization initiator in a diluent consisting of a hydrocarbon in a polymerization zone maintained at a temperature in the range of −20 to 150° C. and in the presence of, as the sole randomizing agent, an amount of a hexaalkyl phosphoramide in the range 0.02 to 0.5 part by weight per hundred parts of total monomer, said organolithium initiator being present in an amount in the range of 0.05 to 150 millimoles per 100 parts by weight of monomer and wherein the mole ratio of phosphoramide to lithium equivalents in said initiator is in the range of 0.3:1 to 1.5:1 and thereafter recovering the resulting random copolymer as a product of the process.

2. A process according to claim 1 wherein said conjugated diene is 1,3 - butadiene and said vinyl-substituted aromatic hydrocarbon is styrene.

3. A process according to claim 1 wherein said hexaalkyl phosphoramide is selected from those having the formula

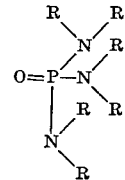

wherein R is an alkyl radical containing from 1 to 8 carbon atoms.

4. The method of claim 1 wherein said hexaalkyl phosphoramide is hexamethylphosphoramide.

References Cited
UNITED STATES PATENTS

| 3,202,642 | 8/1965 | Hardy | 260—83.7 |
| 3,280,094 | 10/1966 | Forman | 260—83.7 |
| 3,288,872 | 11/1966 | House | 260—84.7 |

JAMES A. SEIDLECK, *Primary Examiner.*